United States Patent [19]

Hilliard, Jr. et al.

[11] Patent Number: 5,513,680

[45] Date of Patent: *May 7, 1996

[54] PORTABLE APPARAUS AND METHOD FOR VENTING A STORAGE VESSEL

[75] Inventors: Henry T. Hilliard, Jr., 3822 Piping Rock, Houston, Harris County, Tex. 77027; Jerry B. Roach, Houston, Tex.; Gary N. Lawrence, Friendswood, Tex.

[73] Assignee: Henry T. Hilliard, Jr., Houston, Tex.

[ * ] Notice: The term of this patent shall not extend beyond the expiration date of Pat. No. 5,377,723.

[21] Appl. No.: 348,545

[22] Filed: Dec. 1, 1994

Related U.S. Application Data

[63] Continuation of Ser. No. 274,023, Jul. 12, 1994, Pat. No. 5,476,126, which is a continuation of Ser. No. 117,397, Sep. 3, 1993, Pat. No. 5,377,723.

[51] Int. Cl.$^6$ ........................................... F17C 5/00
[52] U.S. Cl. .................. 141/4; 141/63; 141/83; 141/197; 141/231; 141/82
[58] Field of Search .................... 141/1, 4, 8, 9, 141/11, 44, 45, 51–53, 59, 63, 67, 70, 82, 83, 94, 192, 197, 231; 62/50.2–50.4, 50.7

[56] References Cited

U.S. PATENT DOCUMENTS

| | | |
|---|---|---|
| 249,918 | 11/1881 | Forster . |
| 290,558 | 12/1883 | Finn ........................ 220/745 |
| 291,085 | 1/1884 | Reinecke ................ 220/745 |
| 1,269,639 | 6/1918 | Parr . |
| 1,918,100 | 7/1933 | Harnsberger . |
| 2,682,752 | 7/1954 | Branson . |
| 3,012,591 | 12/1961 | McCormack et al. ...................... 141/4 |
| 3,123,249 | 3/1964 | Gorand et al. . |
| 3,556,174 | 1/1971 | Gibble et al. ............... 141/69 |
| 3,763,901 | 10/1973 | Viland ..................... 141/52 X |
| 3,783,911 | 1/1974 | Husa et al. ................. 141/11 |
| 3,817,687 | 6/1974 | Cavallero et al. ....... 431/202 |
| 3,914,095 | 10/1975 | Straitz, III .............. 141/52 X |
| 3,914,115 | 10/1975 | Parker, Sr. ................. 55/32 |
| 3,918,932 | 11/1975 | Lee et al. ..................... 55/62 |
| 3,926,230 | 12/1975 | Stary et al. ................. 141/45 |
| 3,972,201 | 8/1976 | Datis ............................ 62/54 |
| 4,134,271 | 1/1979 | Datis ............................ 62/54 |
| 4,162,694 | 7/1979 | Caldwell ..................... 141/1 |
| 4,187,689 | 2/1980 | Selcukoglu et al. ........ 62/54 |
| 4,344,467 | 8/1982 | Lahde ................... 141/197 X |
| 4,469,143 | 9/1984 | Vazin ........................... 141/1 |
| 4,604,115 | 8/1986 | Bonneton et al. .......... 62/50.2 X |
| 4,765,143 | 8/1988 | Crawford et al. .......... 60/671 |
| 4,981,153 | 1/1991 | Perkins ....................... 137/1 |
| 4,989,363 | 2/1991 | Doernemann . |
| 5,017,240 | 5/1991 | Brown ..................... 134/22.1 |
| 5,172,738 | 12/1992 | Komukai et al. .......... 141/83 |
| 5,186,219 | 2/1993 | Gold et al. ................. 141/51 |
| 5,186,219 | 2/1993 | Gold et al. ................. 141/51 |
| 5,381,667 | 1/1995 | Worley et al. ............. 62/50.2 |

FOREIGN PATENT DOCUMENTS

8196396  11/1983  Japan ........................ 141/9

*Primary Examiner*—J. Casimer Jacyna
*Attorney, Agent, or Firm*—Elizabeth R. Hall; Winstead Sechrest & Minick

[57] ABSTRACT

A mobile method and apparatus for venting volatile organic compound vapors from a liquid storage vessel which includes the steps of introducing a purge medium to a liquid storage vessel containing volatile organic compound vapors and establishing an uniform and continuous stratified interface between the purge medium and the volatile organic compound vapors. The introduction of the purge medium is continued causing the continuous stratified interface to move within the vessel purging the virtually undiluted volatile organic compound vapors from the vessel and into a vapor recovery line which delivers the volatile organic compound vapors to a vapor control device. Preferably, the purge medium comprises carbon dioxide or nitrogen.

30 Claims, 6 Drawing Sheets

PORTABLE APPARAUS AND METHOD FOR VENTING A STORAGE VESSEL

REFERENCE TO RELATED PATENT APPLICATIONS

The present application is a continuation-in-part of U.S. application Ser. No. 08/274,023 filed Jul. 12, 1994, now U.S. Pat. No. 5,476,126, and entitled "Method and Apparatus for Venting a Storage Vessel," the entire contents and disclosure of which are hereby specifically incorporated by reference. Said U.S. application Ser. No. 08/274,023 is a continuation of U.S. application Ser. No. 08/117,397 filed Sep. 3, 1993, now U.S. Pat. No. 5,377,723, and entitled "Method and Apparatus for Venting a Storage Vessel."

TECHNICAL FIELD OF THE INVENTION

The present invention relates to a portable apparatus and its use for venting residual vapors from a liquid storage vessel. More particularly, the present invention relates to a method and mobile apparatus for venting residual vapors from a liquid storage vessel by introducing a gas to the storage vessel after removal of all liquids to provide a motive force to vent the vapors.

BACKGROUND OF THE INVENTION

Description of the Prior Art

Volatile liquids, such as benzene, petroleum and the like, are often stored in tanks at bulk terminals, refineries and end-user facilities, and transported in tanks aboard barges or ships, tank trucks and rail cars. All such containers shall be referred to herein as liquid storage vessels. While resident in these liquid storage vessels, volatilization of the liquid occurs leaving residual vapors which must be removed before workmen can be permitted to enter the vessel and before certain types of work, particularly hot work such as welding, may be done to the vessel.

Currently, such residual vapors are purged by flooding liquid storage vessels with a sufficient volume of water or air to dilute the vapors and carry them out of the vessel. The resulting mixture of diluted vapors, in many cases, are simply emitted to the atmosphere and surrounding water supply where they pollute the environment. Emissions handled in this manner lead to severe environmental hazards. For example, the inhalation of benzene vapors may cause depression of bone marrow activity, convulsions and paralysis. In addition, hydrocarbons are a major contributor to the formation of smog which has been proven to increase respiratory disorders among the population.

In addition to these environmental problems, water flushing facilities must overcome many economic hurdles. Adequate water for such facilities may be expensive due to limited water resources or to restrictions concerning the reuse or recycling of the water. If the water must be reused or recycled, it must be treated to remove contaminants that might pollute the environment or contaminate the next vessel to be flushed.

The environmental problems associated with air flooding could be eliminated by sending the mixture of vented air and vapors to a control device where the harmful vapors would be contained rather than emitted to the atmosphere. Unfortunately, three or more times the storage vessel volume must be cycled through the vessel to ensure that all of the residual vapors are purged from the vessel. Clearly, such a solution is expensive because of the large amount of air which would have to be heated in a combustion device before the volatiles they carry would be destroyed. The size of the collection piping and combustion equipment associated with such a process, in addition to the amount of fuel required to combust the vapors, similarly would be quite large, thereby prohibitively increasing the cost of such a process.

There have been several patents in the prior art which attempted to address the problem of removing vapors from storage tanks and collecting the gases which are forced out of the storage tank to reuse such gases for combustion.

U.S. Pat. No. 291,085 shows apparatus for removing flammable gases from oil tanks which includes devices for causing an induced current of air to pass into a storage tank above the surface of the fluid (such as fuel oil) and at the same time conduct displaced gases to a point where they may be used as fuel or discharged with safety into the atmosphere. The patent which issued in 1884 teaches the use of air as a medium for forcing gaseous vapors from a storage tank.

It has been learned over the past hundred years that air is an unsafe medium for use in cleansing storage tanks and also can result in corrosion of the tank. The device shown by U.S. Pat. No. 291,085 is relatively simple and primitive and does not include the safety features or efficient means for recapture of vapors for other uses as is claimed by the present invention.

U.S. Pat. No. 1,918,100 shows a gas-gathering system which is basically a closed system in which vapors which collect in a storage tank are pumped into a secondary vapor storage tank partially filled with water and from the vapor storage tank are recaptured through a compression and condensing process to provide dry gas for other uses such as combustion. The patent states as its primary objective the provision of a method and apparatus for maintaining a hydrocarbon gas at all times within the storage tanks above the liquid levels thereof with the specific end in view of preventing air or oxygen from entering the tanks and mixing with the gases contained therein.

It should be noted at this point that U.S. Pat. No. 1,918,100 specifically teaches away from the method and apparatus of the U.S. Pat. No. 291,085 patent in that U.S. Pat. No. 291,085 teaches the use of air as a medium for moving vapors out of a storage tank, and U.S. Pat. No. 1,918,100 specifically provides a method to prevent air or oxygen from entering the tank and mixing with the gases.

Although the U.S. Pat. No. 1,918,100 patent is a more modern gas collection system apparatus and method, it does not show nor suggest the present invention which includes control of the flow of a purge medium to provide a laminar flow to create a continuous stratified interface between the volatile vapors and the purge medium. Nor does U.S. Pat. No. 1,918,100 teach or suggest any mechanism for detection of completion of the purging operation nor mixing with a high BTU material for later combustion. Nor does either prior art patent introduce gas at the bottom of the tank as is shown and claimed with respect to one embodiment of the present invention.

SUMMARY OF THE INVENTION

The mobile method and apparatus for venting a liquid storage vessel of the present invention overcome the above-noted disadvantages and drawbacks which are characteristic of the prior art.

The present invention is directed to a method which comprises the steps of introducing a purge medium to a liquid storage vessel containing volatile organic or other vapors and establishing a uniform and continuous stratified interface between the purge medium and the volatile organic compound vapors. The introduction of the purge medium is continued causing the continuous stratified interface to move within the vessel purging the undiluted volatile organic compound vapors from the vessel.

In a preferred embodiment, a purge medium, preferably carbon dioxide, is introduced to the bottom of a liquid storage vessel containing relatively light volatile organic compound vapors establishing a uniform and continuous stratified interface between the purge medium and the volatile organic compound vapors. The purge medium is introduced at a controlled flow rate, a predetermined pressure, and at a temperature that is lower than that of the vapors to be displaced causing the continuous stratified interface to rise within the vessel purging the undiluted volatile organic compound vapors from the top of the vessel.

In an alternate preferred embodiment, a purge medium, preferably nitrogen, is introduced to the top of a liquid storage vessel containing relatively heavy volatile organic compound vapors establishing a uniform and continuous stratified interface between the purge medium and the volatile organic compound vapors. The introduction of the purge medium is at a controlled flow rate, and a predetermined temperature and pressure causing the continuous stratified interface to descend within the vessel purging the undiluted volatile organic compound vapors from the bottom of the vessel.

In a preferred embodiment, the undiluted volatile organic compound vapors are purged into a vapor recovery line which delivers the volatile organic compound vapors to a vapor control device.

The present invention also is directed to apparatus for performing the above-described methods. A preferred embodiment of the apparatus is portable and can easily go from one storage vessel to another storage vessel.

BRIEF DESCRIPTION OF THE DRAWINGS

Numerous objects, features and advantages of the present invention will be readily apparent to those of ordinary skill in the art upon a reading of the following disclosure when taken in conjunction with the accompanying drawings, in which.

DETAILED DESCRIPTION OF THE PREFERRED EMBODIMENTS

Figure 1:
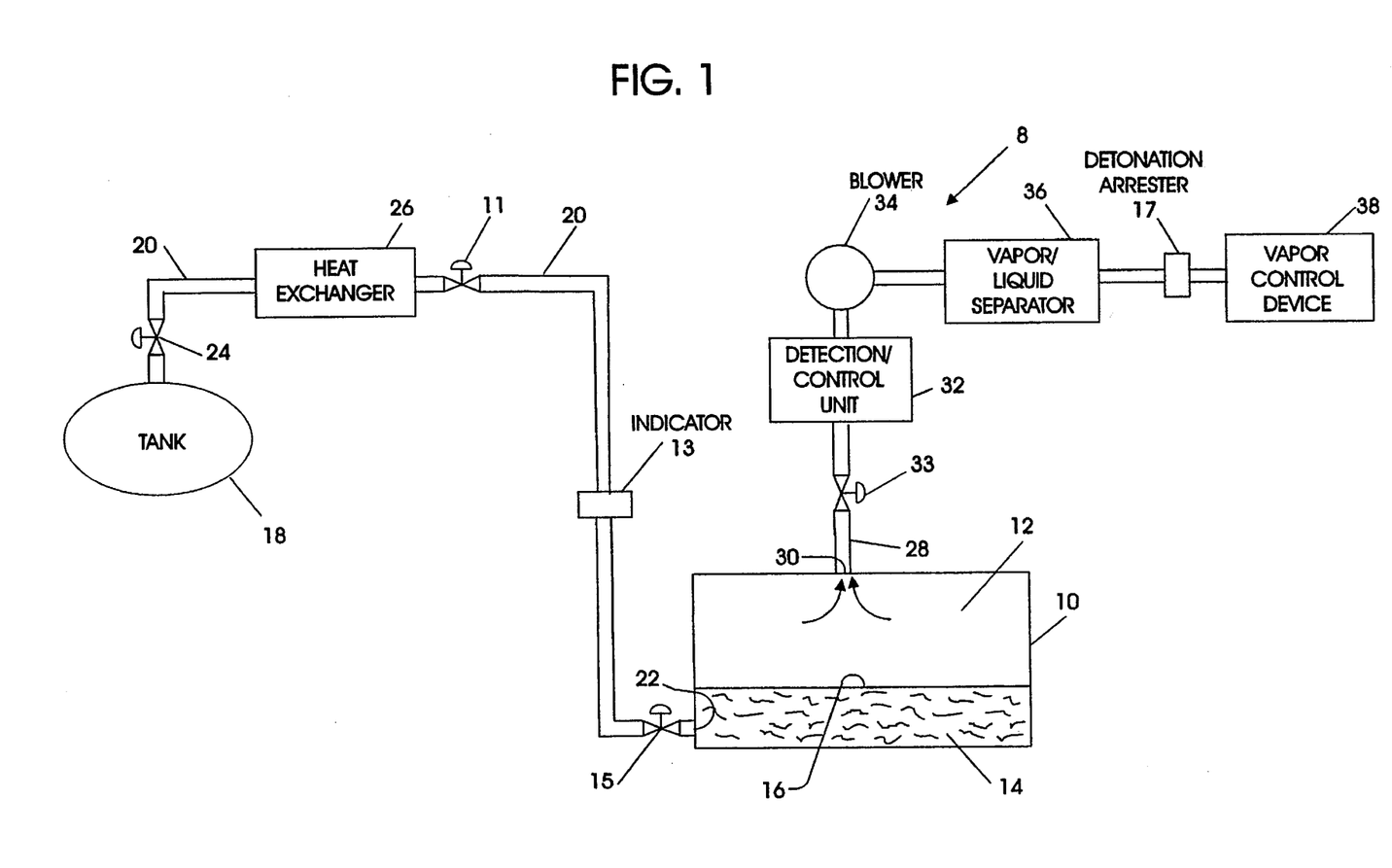
FIG. 1 shows a schematic view of a preferred embodiment of an apparatus for performing the storage tank venting method of the present invention.

Referring now to the drawings, and particularly to FIG. 1, a schematic representation of a preferred embodiment of a liquid storage vessel venting apparatus arranged to perform the method of the present invention is generally shown at 8. A liquid storage vessel 10 of typical construction has apertures for receiving and dispensing various fluids, including volatile organic compounds such as benzene and petroleum products which generate vapors 12. The present invention is fully operational on all standard types of storage vessels 10.

According to this embodiment, a gas 14 is introduced at or near the bottom of the vessel 10 to provide a motive force to purge the vapors 12 from the vessel 10. The gas 14 preferably is heavier than, colder than and inert with respect to the vapors 12, and is introduced to the vessel 10 in a laminar, or near laminar, flow with little or no turbulence. As the gas 14 enters the vessel 10, an uniform stratification develops with the vapors 12 forming a layer above a layer formed by the gas 14. In this manner, mixing of the gas 14 with the vapors 12 is avoided and the vapors 12 remain virtually undiluted. As shown in FIG. 1, an uniform interface 16 develops between the gas 14 and the vapors 12. As more gas 14 is introduced to the vessel 10, the interface 16 approaches the top of the vessel 10 driving the undiluted vapors 12 from the vessel 10. Preferably, the gas 14 is such that it may be dispersed into the environment without contaminating the surrounding area. Preferably, the gas 14 comprises carbon dioxide. Those of ordinary skill in the art will recognize that other gases (eg. nitrogen) that are heavier or lighter than the vapors 12 may also be utilized as the gas 14.

A supply of gas 14 is provided in an insulated tank 18. Preferably, the gas 14 is stored in tank 18 in a chilled liquid state under pressure. A valve 24 is provided between tank 18 and a fill line 20. Valve 24 may be a shut-off valve, a pressure release valve, a pressure control valve, or a combination of such valves.

When valve 24 is opened gas 14, either in its liquid state or as a gas, traverses fill line 20 to heat exchanger 26. Heat exchanger 26 will heat gas 14 to a desired temperature, preferably between 50° F. and 110° F.

Heat exchanger 26 may heat gas 14 directly or indirectly. The preferred embodiment of heat exchanger 26 will indirectly heat gas 14 by utilizing a gas fired water heater. However, a person skilled in the art will recognize that any medium (water, oil, metal heat sink, etc.) may be heated by any type of energy source (gas, propane, natural gas, diesel, electricity, solar energy, etc.) or mixture of energy sources such that when gas 14 passes through heat exchanger 26 gas 14 can absorb the heat from the heated medium to increase the temperature of gas 14 to a desired temperature.

Gas 14 passes through a control valve 11 as it leaves heat exchanger 26 and continues to travel along fill line 20 towards vessel 10. Control valve 11 may be a pressure release valve, a shut-off valve, a pressure control valve or any combination of such valves. As the pressure of gas 14 is reduced the temperature of gas 14 is decreased (due to auto-refrigeration) as the gas 14 passes through fill line 20. The temperature and pressure of the gas 14 can be monitored along fill line 20 by an optional indicator 13. Indicator 13 may be one or more temperature and pressure monitoring devices.

In a preferred embodiment using carbon dioxide as gas 14, the heating of gas 14 in heat exchanger 26 under storage tank pressure will prevent the formation of dry ice when the pressure of gas 14 is further reduced as it passes through fill line 20 from the heat exchanger 26 to vessel 10.

An optional tank entry valve 15 assures that gas 14 is at an appropriate pressure when it enters vessel 10. A preferred embodiment of the invention, as illustrated in FIG. 1, will reduce the pressure of gas 14 to about atmospheric pressure and the temperature of gas 14 to be less than or equal to that of vapors 12 before introducing gas 14 into vessel 10 via an opening 22 disposed near the bottom of vessel 10.

Figure 2:
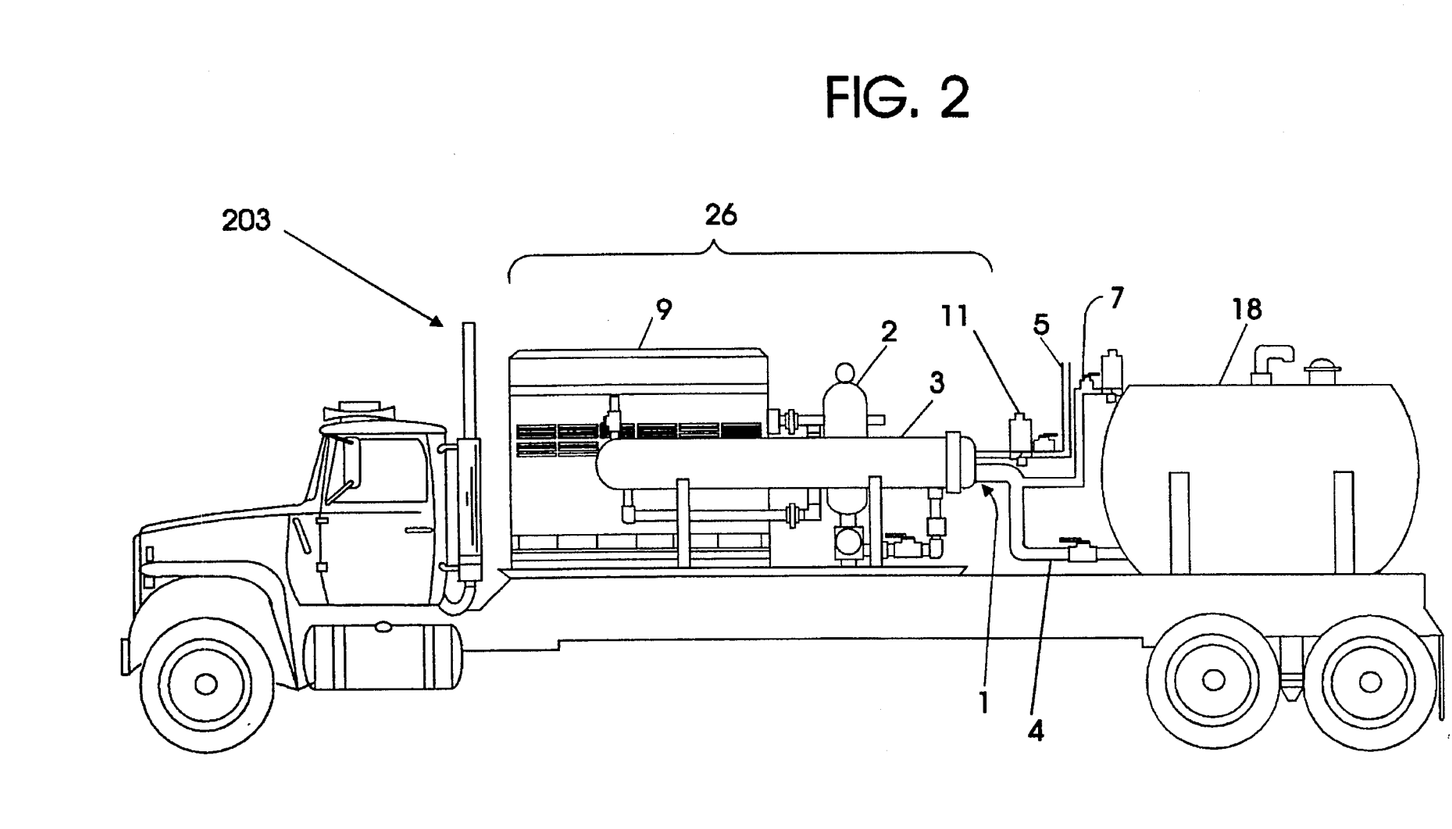
FIG. 2 shows a representation of one embodiment of a mobilized gas introductory unit.

The tank 18, fill line 20, heat exchanger 26, indicator 13, valve 24, control valve 11 and tank entry valve 15 may be conveniently localized on a mobilized gas introductory unit 203 as seen in FIG. 2. Introductory unit 203 may be a truck as illustrated in FIG. 2 or introductory unit 203 may be a trailer, a skid, a boat, or any other mobile vehicle. The preferred embodiment illustrated in FIG. 2 contains a large capacity liquid carbon dioxide tank 18, an indirect heat exchanger 26, and a compartment 201 for storing fill line 20, and assorted valves and indicators and/or monitors.

FIG. 2 shows a preferred embodiment of heat exchanger 26 that indirectly heats gas 14 utilizing a gas fired water heater 9. Gas 14 enters inlet 1 of gas heating component 3 either as a liquid through line 4 or as vapors through line 7. Gas heating component 3 comprises a pipe around which hot water is circulated within an enclosure. The gas 14 enters the pipe at inlet 1, passes through the pipe (which traverses the gas heating component 3 at least one time) and leaves at exit 5. Gas fired water heater 9 utilizes natural gas or propane stored in tank 2 to heat the water to the appropriate temperature.

One of the major advantages of the present invention is that it is mobile and can be delivered to and used to vent vapors from any type of storage tank at any location.

Figure 3:
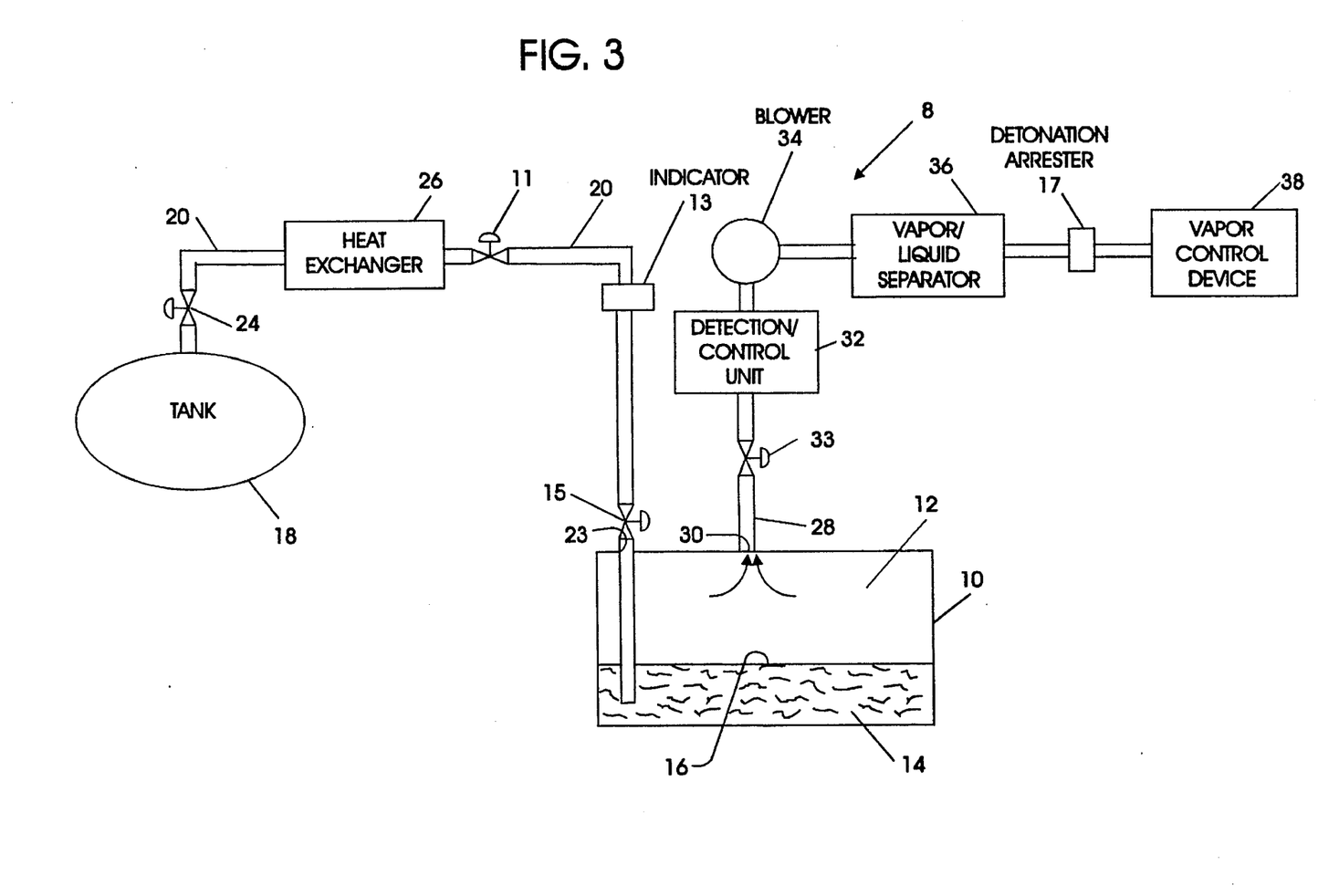
FIG. 3 shows a schematic view of a modified version of the apparatus depicted in FIG. 1.

As shown in FIG. 3, the gas 14 may alternatively be delivered to the vessel 10 through a fill line 20, which extends through an opening 23, disposed on the top of the vessel 10. The distal end of the fill line 20, is disposed near the bottom of the vessel 10 to introduce the gas 14 beneath the vapors 12.

Referring to both FIGS. 1 and 3, a vapor recovery line 28 extends from an opening 30 disposed in the roof of the vessel 10 to receive the vapors 12 that are purged from the vessel 10 as it is filled with the gas 14. An optional post-vessel control valve 33 may be placed in line 28 as it leaves vessel 10. Post-vessel control valve 33 may be a shut-off valve, a pressure control valve, a vacuum release valve, a pressure release valve, or any combination of such valves.

A detection/control unit 32 is provided in the recovery line 28 to monitor the gas purged from the vessel 10. The detection/control unit 32 may contain a gas detector to monitor the presence of vapors 12 purged from vessel 10 or to check for the presence of gas 14. Unit 32 may be set to detect a predetermined value either for the absence of vapors 12 or the presence of gas 14. When that predetermined value is reached, unit 32 may signal the closing of valve 24, 11, or 15 through a remote sensing device attached to a designated valve. The detection of gas 14 or the absence of vapors 12 will signal the completion of the venting process.

In addition, unit 32 may also be programmed to detect the rate of flow and temperature of vapors 12 and/or gas 14. The sensing devices can be programmed to signal the damping of valve 24, pressure control valve 11, or tank entry valve 15 or to alter the settings on the heat exchanger 26 to vary the temperature and/or flow rate of gas 14 to maintain the laminar flow of gas 14 into vessel 10 and the optimum purging of vapors 12. For example, if the vapors 12 entering the vapor recovery line 28 are too hot then a signal can be sent to a remote sensing three-way mixing valve in heat exchanger 26 to reduce the temperature of the hot water going to the indirect heating device or to increase the flow of the cryogen.

Alternatively, unit 32 may have preset values of various parameters such as oxygen concentration, flow rate, temperature, or pressure. Whenever a measured parameter falls outside of the preset values for that parameter an alarm would sound and the venting operator would know to take the appropriate measures to reoptimize the venting system.

An optional low pressure blower 34 may be provided to receive the vapors 12 exiting unit 32 and to direct the vapors 12 to a vapor control device 38 described below. To prevent the vessel 10 from collapsing, care must be taken to prevent the blower 34 from creating an excessive vacuum within the vessel 10. For example, unit 32 may contain a pressure indicator that would signal blower 34 to shut-off, or would sound an alarm, if excessive vacuum developed in recovery line 28.

The vapors 12 may be directed by the blower 34 through a vapor/liquid separator 36 which will remove condensed liquid droplets from vapors 12 flowing through the recovery line 28. After passing through the separator 36, the vapors 12 may be passed through a detonation arrester 17 and on to a vapor control device 38.

One skilled in the art would recognize that the order of the components along the recovery line 28 is not critical. For example, under some circumstances one may want the vapors 12 to pass through the vapor/liquid separator 36 before it passes through unit 32 or blower 34. Numerous permutations of the sequence of vapor handling components exist and may be customized for each particular application.

Vapor control device 38 may be any of a variety of devices. For example, the vapor control device 38 may include adsorption chambers of an adsorbing substance (such as activated charcoal, resins or catalyst) capable of adsorbing gasoline or other vapors from air. Thus, passing vapors 12 through adsorption chambers would remove vapors 12 from the air intermixed therewith, and thereby permit the release of the cleaned air into the atmosphere.

Vapor control device 38 may also represent a condensation/refrigeration unit which would cool the vapors 12 and recover the liquid condensate. A preferred embodiment will use the recovered liquids as fuel in a combustion engine. Recovered liquids may also be stored under pressure in a storage tank for further handling. After removal of the condensed volatile organic vapors, the cleaned air may be released into the atmosphere.

Another embodiment of vapor control device 38 is a flare by which vapors 12 are combusted prior to their emission to the atmosphere. If the combustibility of vapors 12 is insufficient for adequate burning, a supply of natural gas, propane, butane or other combustible material may be provided to increase the BTU level of vapors 12.

Those of ordinary skill in the art will recognize that a variety of vapor control devices, including a combination of vapor control devices, may be utilized as the circumstances may dictate.

Figure 4:
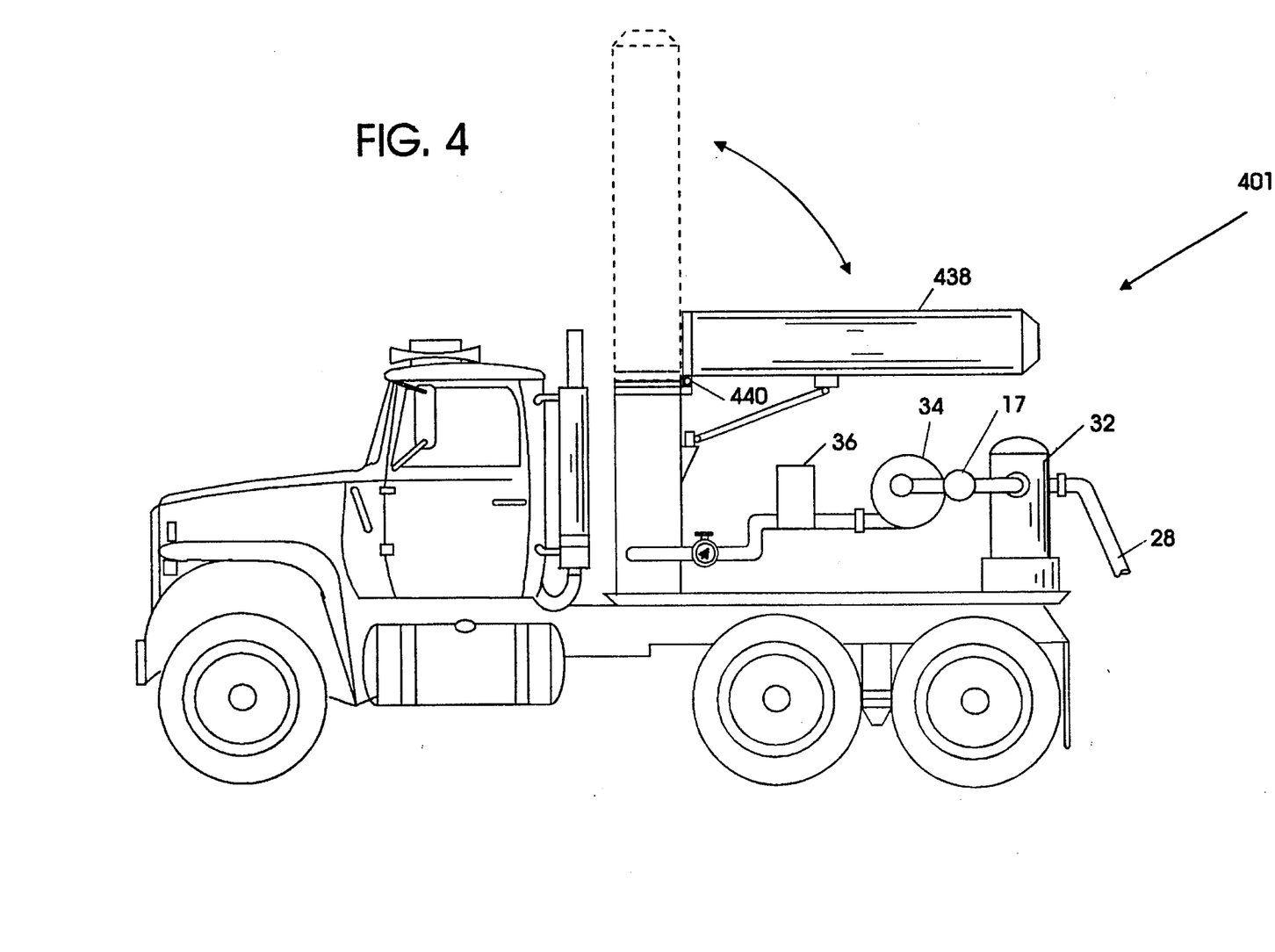
FIG. 4 shows a preferred embodiment of a mobilized vapor recovery unit.

The vapor recovery line 28, detection/control unit 32, blower 34, separator 36, detonation arrester 17, and vapor control device (preferably flare 438) may be conveniently localized on a mobile vapor recovery unit 401 as seen in FIG. 4. Vapor recovery unit 401 may be a truck as illustrated in FIG. 4 or a trailer, a skid, a boat, etc. The preferred embodiment illustrated in FIG. 4 has a vapor recovery line 28 connected to unit 32. Unit 32 is connected by a pipe to detonation arrester 17, blower 34 and separator 36. As vapors 12 pass through separator 36, any liquid condensate is removed from the vapors 12 and the vapors 12 are then sent into a flare 438. Flare 438 may have an optional hinge 440 that allows its smoke stack to fold into a horizontal position when not in use or when the vapor recovery unit 401 is moving. FIG. 4 also indicates the vapor recovery unit 401 with flare 438 upright and ready for operation.

A person skilled in the art would recognize that the entire venting system described herein, except for the storage vessel, may be localized on a single mobile unit so that it can be easily transported from site to site. Although FIG. 2 and FIG. 4 show the gas introductory unit 203 and the vapor recovery unit 401 on two separate trucks, these two units could be placed on a single skid or trailer, or each unit could be placed on a separate skid or trailer with both skids/trailers carried on one truck, barge, train, etc.

Once the venting process is completed, gas 14 will fill vessel 10. Gas 14 may be immediately dispersed directly into the atmosphere, or may be stored in vessel 10 to be displaced when vessel 10 is refilled with another liquid or gas.

Figure 5:
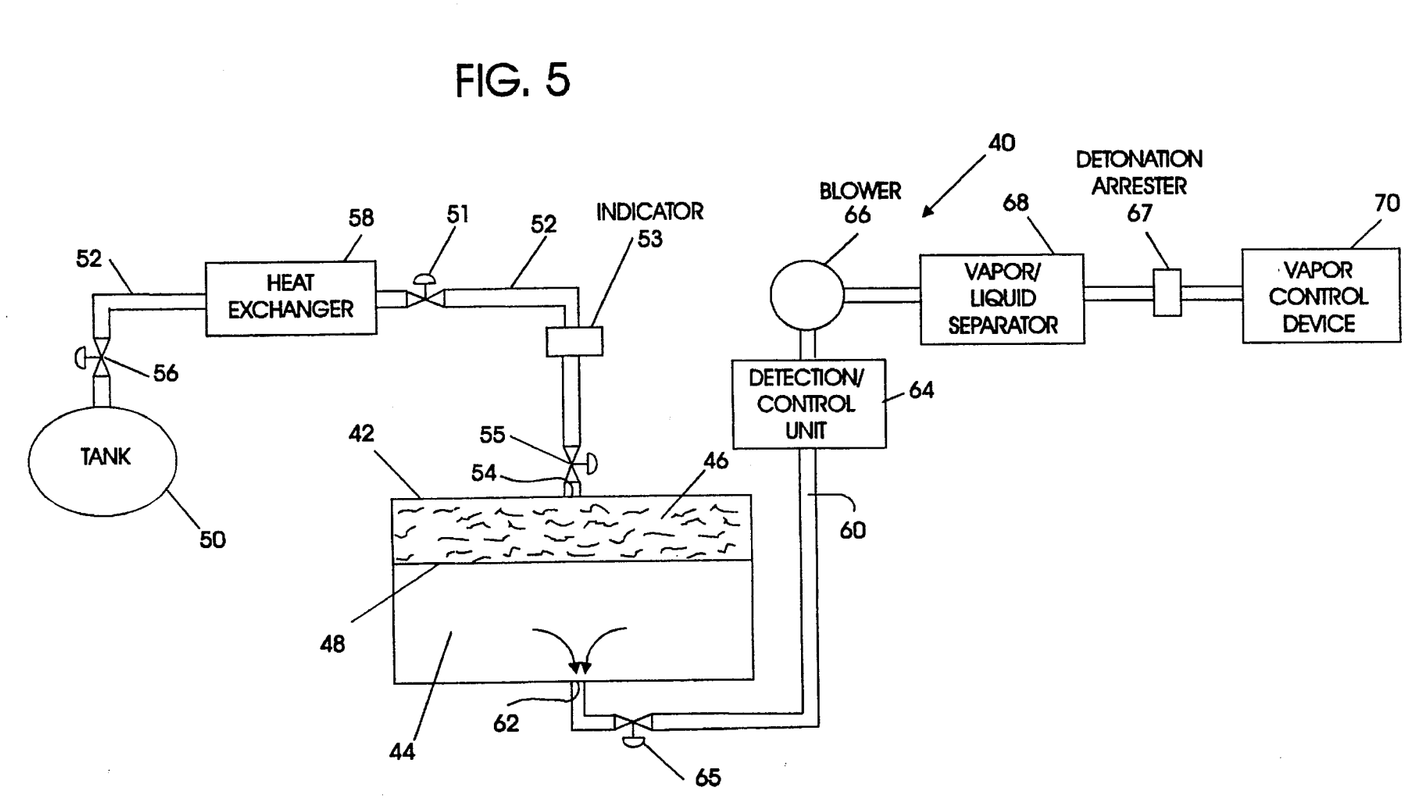
FIG. 5 shows a schematic view of one embodiment of an apparatus for performing the storage tank venting method of the present invention.

Referring now to FIG. 5, a schematic of another preferred embodiment of the present invention is shown and referred to in general by the reference numeral 40. A liquid storage vessel 42 of typical construction has apertures for receiving and dispensing various fluids, including volatile chlorinated hydrocarbon compounds such as perchlorethylene and other chlorinated products which generate vapors 44.

According to this embodiment, a gas 46 is preferably introduced at a temperature that is greater than or equal to vapors 44 at or near the top of the vessel 42 to provide a motive force to purge the vapors 44 from the vessel 42. This embodiment where gas 46 is introduced at the top of vessel 42, is preferably used when gas 46 is lighter than and inert with respect to the vapors 44, or when vapors 44 are at a much colder temperature than feasible for the introduction of the purge gas. Gas 46 is introduced to the vessel 42 in a laminar, or near laminar, flow with little or no turbulence. As the gas 46 enters the vessel 42, an uniform stratification develops with the gas 46 forming a layer above a layer comprised of the vapors 44. In this manner, mixing of the gas 46 with the vapors 44 is avoided and the vapors 44 remain virtually undiluted. As shown in FIG. 5, an uniform interface 48 develops between the gas 46 and the vapors 44. As more gas is introduced to the vessel 42, the interface 48 approaches the bottom of the vessel 42 driving the vapors 44 from the vessel 42. Typically, the gas 46 is chosen such that it may be dispersed into the environment without contaminating the surrounding area. Preferably, the gas 46 comprises nitrogen, but those of ordinary skill in the art will recognize that other gases that are lighter than the vapors 44 may also be utilized as the gas 46. This embodiment is preferred for cleaning tanks containing heavy gases such as chlorinated hydrocarbons.

A supply of gas 46 is provided in an insulated tank 50. Preferably, the gas 46 is stored in tank 50 under high pressure. A valve 56 is provided between tank 50 and a fill line 52. Valve 56 may be a shut-off valve, a pressure control valve, a safety relief valve or a combination of such valves. Gas 46 traverses fill line 52 to heat exchanger 58. Heat exchanger 58 will heat gas 46 to a desired temperature. As the gas 46 is heated the gas expands, increasing the pressure of gas 46.

Gas 46 passes through a control valve 51 as it leaves heat exchanger 58 and continues to travel along fill line 52 towards vessel 42. Control valve 51 may be a shut-off valve, a safety relief valve (to release excess pressure), a pressure control valve, or a combination of such valves. The temperature and pressure of the gas 46 can be monitored along fill line 62 by an optional indicator 53. Indicator 53 may be one or more temperature and pressure monitoring devices.

An optional tank entry valve 55 assures that gas 46 is at an appropriate pressure and flow rate when it enters vessel 42. A preferred embodiment of the invention, as illustrated in FIG. 5, will introduce gas 46 at or near atmospheric pressure and at a temperature equal to or more than that of vapors 44. Gas 46 is introduced into vessel 42 via an opening 54 disposed near the top of vessel 42. The gas is introduced at a desired temperature, pressure and flow rate.

Since heat exchanger 58, indicator 53, valve 56, control valve 51, and tank entry valve 55 are the same as the corresponding devices illustrated in FIG. 1 and described in connection thereto, these devices will not be described in detail here. Furthermore, the tank 50, fill line 52, heat exchanger 58, indicator 53, valve 56, control valve 51 and tank entry valve 55 may be conveniently localized on a mobilized gas introductory unit 203 as seen in FIG. 2. Introductory unit 203 may be a truck as illustrated in FIG. 2 or introductory unit 203 may be a trailer, a skid, a boat, etc.

Since introductory unit 203 will have corresponding devices when incorporating the embodiment illustrated in FIG. 5 to those discussed above where unit 203 incorporated the embodiment illustrated in FIG. 1, these devices and unit 203 will not be described in detail here.

Figure 6:
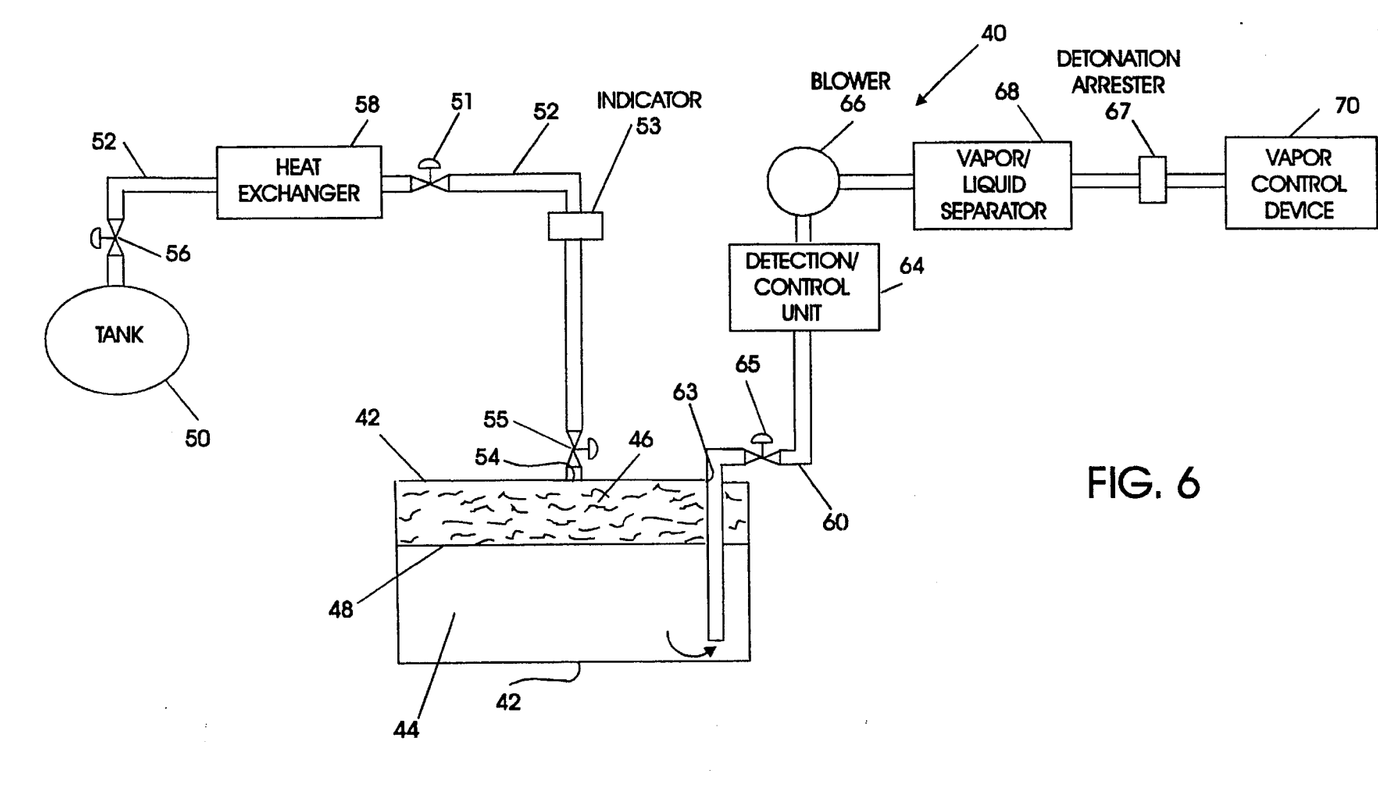
FIG. 6 shows a schematic view of a modified version of the apparatus depicted in FIG. 5.

A vapor recovery line 60 extends from an opening 62 disposed near the bottom of the vessel 42 to receive the vapors 44 that are purged from the vessel 42 as it is filled with the gas 46. Alternatively, and as shown in FIG. 6, a vapor recovery line 60, extends into the vessel 42 through an opening 63 disposed on the top of the vessel 42. The proximal end of the recovery line 60, is disposed near the bottom of the vessel 42 to receive the vapors 44 as the vessel 42 fills with the gas 46. A post-vessel control valve 65 may be located along recovery line 60 close to opening 63. Post-vessel control valve 65 may be a shut-off valve, a pressure release valve, a pressure control valve, a vacuum release valve, or any combination of such valves.

Referring to both FIGS. 5 and 6, a detection/control unit 64 may be provided in the recovery line 60 to monitor the gas purged from the vessel 42 or to check for the presence of the gas 46. When the gas 46 is detected in a predetermined quantity by the gas detector 64, the venting process has been completed.

A low pressure blower 66, a vapor/liquid separator 68, a detonation arrester 67, and a vapor control device 70 may be provided to receive the vapors 44 exiting the detection unit 64 to process them for further handling. Since these devices are the same as the corresponding devices described in connection with the previous embodiment, they will not be described here in detail.

The present invention will be further illustrated by the following specific examples, it being understood that while these examples may describe in detail some of the preferred features of the invention, they are merely provided for the purpose of illustration and are not intended to limit the broader aspects of the present invention.

EXAMPLE 1

A test of the present invention was conducted to vent the gaseous contents of a liquid storage vessel carried aboard a barge. For the purpose of this test, volatile organic compound vapors were removed from the tank so that it contained only air.

Liquid carbon dioxide stored in an insulated tank truck at about 0° F. and about 300 psia was released into a fill line, and then to a heat exchanger where the liquid was warmed to approximately 80° F. and vaporized. The gas was released to a pressure reducing valve which reduced the pressure of the gas from 300 psia to about 10 psia causing the carbon dioxide gas to auto-refrigerate to about 30° F. In this way the pressure of the carbon dioxide within the fill line was dropped to atmospheric pressure without forming solids.

The carbon dioxide gas was then introduced to the bottom of the vessel through an 8 inch line at a flow rate of approximately 7,000 cfh. It was admitted in a nonturbulent, metered flow to create an even and uniform stratification between the air present in the vessel and the incoming carbon dioxide gas. An air-carbon dioxide gas interface formed in the vessel and continually rose toward the roof of the vessel as more carbon dioxide gas was admitted. As the interface rose, the air in the vessel was forced toward and through an opening in the roof of the vessel without experiencing any significant mixing of the air and carbon dioxide gas, leaving the vessel completely void of air and full of carbon dioxide gas.

EXAMPLE 2

All liquids are removed from a liquid storage vessel carried aboard a barge. The liquid storage vessel contains volatile organic compound vapors.

Liquid carbon dioxide stored in an insulated tank truck at about 0° F. and about 300 psia was released into a fill line, and then to a heat exchange where the liquid was warmed to approximately 80° F. and vaporized. The gas was released to a pressure reducing valve which reduced the pressure of the gas from 300 psia to about 10 psia causing the carbon dioxide gas to auto-refrigerate to about 30° F. In this way the pressure of the carbon dioxide within the fill line was dropped to atmospheric pressure without forming solids.

The carbon dioxide gas is then introduced to the bottom of the vessel through an 8 inch line at a flow rate of approximately 7,000 cfh. It is admitted in a nonturbulent, metered flow to create an even and uniform stratification between the volatile organic compound vapors present in the vessel and the incoming carbon dioxide gas. A volatile organic compound vapor-carbon dioxide gas interface forms in the vessel and continually rises toward the roof of the vessel as more carbon dioxide gas is admitted. As the interface rises, the air in the vessel is forced toward and through an opening in the roof of the vessel without experiencing any significant mixing of the volatile organic compound vapors and carbon dioxide gas, leaving the vessel completely void of volatile organic compound vapors and full of carbon dioxide gas.

The purged volatile organic compound vapors, virtually undiluted by employing the present invention, are forced into a recovery line connected to the vessel. The carbon dioxide gas is introduced into the vessel until a detector in the recovery line detects the presence of the carbon dioxide gas. At this point, due to the uniform stratification maintained within the vessel, all of the residual vapors originally in the vessel are purged from the vessel, and the vessel is filled solely with carbon dioxide gas. A blower attached to the recovery line directs the vapors through a vapor/liquid separator to remove any condensed liquids within the vapor stream. The vapors are then directed to a combustion device where, if needed, the vapors are mixed with natural gas and combusted prior to their emission to the atmosphere.

EXAMPLE 3

All volatile liquids are removed from a liquid storage vessel.

A truck carrying a large insulated refrigerated tank filled with liquid carbon dioxide, a heat exchanger, and a fill line with various meters and gauges is driven close to the liquid storage tank. A flexible connecting hose is withdrawn from a storage area on the truck and is used to connect the fill line to the storage vessel.

Another truck containing a vapor recovery hose, a detection/control unit, a blower, a detonation arrester, and a vapor control device is also driven close to the storage vessel. The vapor recovery hose is withdrawn from its storage compartment and connected to the outlet of the storage vessel.

The heat exchanger, on the first truck, has a gas fired circulating water heater that is turned on to allow the water in the circulating water heater to reach the appropriate temperature. Then a valve, between the carbon dioxide refrigerated tank and the heat transfer device, is opened and liquid carbon dioxide that has been stored in the refrigerated tank at about 0° F. and about 300 psia is released into a fill line. The carbon dioxide is then passed through the fill line into a heat exchanger where the temperature of the carbon dioxide gas is raised to about 80° F.

The carbon dioxide gas continues to pass through the fill line through several pressure control valves to continually reduce the pressure of the carbon dioxide gas. The pressure of the carbon dioxide as it enters the storage vessel is preferably from about 5 psia to about 1 psia. As the pressure of the carbon dioxide drops the temperature of the carbon dioxide also drops. The temperature of the carbon dioxide is kept as low as possible, generally from about −20° F. to about 50° F. Preferably, the carbon dioxide is introduced into the bottom storage vessel at about atmospheric pressure and at about 0° F. or at less than ambient temperature.

The carbon dioxide is introduced into the vessel at a carefully controlled flow rate of 3,000 cfh or greater. The carbon dioxide is admitted in such a manner as to establish and maintain essentially laminar flow through the vessel. A uniform interface between the organic vapors present in the vessel and the carbon dioxide is created and rises toward the roof of the vessel as more carbon dioxide is admitted. As the interface rises, the vapors are forced toward and through an opening in the roof of the vessel without experiencing any significant turbulence and mixing of the vapors and the carbon dioxide.

The purged vapors, virtually undiluted by employing the present invention, are pushed into a vapor recovery line. A detector in the recovery line signals a valve on the fill line to shut-off the influx of carbon dioxide once carbon dioxide is detected in the vapor recovery line. At this point, due to the laminar flow of carbon dioxide through the vessel, all of the residual vapors originally in the vessel are purged from the vessel, and the vessel is filled with carbon dioxide gas.

A blower attached to the recovery line directs the purged vapors through a liquid/vapor separator to remove any droplets of condensed liquid from the vapor stream. The vapors are then directed to a refrigeration/condensation unit, where the vapors are condensed, collected and recycled to supplement the energy source used to fire the heat transfer device.

It is thus seen that the method and apparatus of the present invention provides several advantages. In general, the present invention reduces the amount of purge medium necessary to vent residual vapors from all types of liquid storage vessels to nearly a single vessel volume. The present invention is mobile and can be used when the storage vessel access is limited. The present invention will work well with a fill line hose connected to the inlet of the vessel and a vapor recovery line connected to the vessel outlet. The system is easy to set up and since the system is portable, when the vessel has been vented, the system can be moved to the next vessel.

In addition, since the present invention eliminates the need for flushing the storage vessel with water or air, it is an environmentally safe and efficient way to vent residual vapors. The essentially laminar flow of the gas through the vessel increases the efficiency of the vessel purging. In fact, the present invention can remove 95–99% of the vapors in a tank or barge with only 1.1 to 1.5 vessel volumes of inert gas.

Since the vapors are essentially undiluted as they leave the vessel, the efficiency of selected vapor control methods is vastly increased. For example, the combustibility of the vapors might be sufficiently high for burning, or at the very least they can be combusted with a minimal addition of fuel. Similarly, undiluted vapors allow for the efficient use of refrigeration to condense the vapors to a liquid state for collection and reuse. Similarly, activated carbon and resins can more effectively process concentrated vapors.

The present invention can also be used to purge residual vapors that are either heavier or lighter than the purge medium.

It is understood that variations of the foregoing can be made within the scope of the present invention. For example, numerous purging mediums can be used to provide the motive force to vent the vessel 10 or 42. Further, the present invention can be used to vent more than just volatile organic compound vapors from liquid storage vessels. It is applicable for venting any type of vapor from any type of enclosure.

Further, a variety of detection units may be employed to monitor the progress of the venting process. For example, a gas detector can be used to signal the presence of purging gas or a flow meter may be used to determine the quantity of purging gas that has entered the vessel. A single turnover of the vessel volume plus 10% extra gas will virtually vent the vapors from the vessel. Since the volume flow rate of the gas and the volume of the vessel are known, the flow meter can also be eliminated, by calculating and using the time needed to introduce enough gas to equal 1.1 times the volume of the vessel. In addition, the blower can be eliminated if the structural design of the vessel is sufficiently high to allow for pushing the vented vapors through the collection piping.

A latitude of modification, change and substitution is intended in the foregoing disclosure and in some instances some features of the invention will be employed without a corresponding use of other features. Accordingly, it is appropriate that the appended claims be construed broadly and in a manner consistent with the scope of the invention.

What is claimed is:

1. A method for venting vapors from a storage vessel having a vapor outlet, comprising the steps of:
   (i) introducing a gas at a controlled temperature, flow rate and pressure into a liquid storage vessel containing volatile organic vapors to maintain substantially laminar flow of said gas into said storage vessel to establish gas-vapor stratification within said vessel;
   (ii) filling said vessel with said gas; and
   (iii) venting said vapors through said outlet.

2. The method of claim 1 wherein said gas is lighter than said vapors and is introduced into said storage vessel at a lower temperature than the temperature of said vapors in said storage vessel.

3. The method of claim 1 wherein said gas is inert with respect to said vapors.

4. The method of claim 1 further comprising the step of detecting the presence of said gas in said outlet to indicate the completion of said venting.

5. The method of claim 1 further comprising the step of removing condensed liquids from said vented vapors.

6. The method of claim 1 further comprising the step of burning said vented vapors in a combustion device.

7. A method for venting vapors from a storage vessel, comprising the steps of:
   (i) connecting a fill line to a liquid storage vessel containing volatile organic vapors;
   (ii) connecting a vapor recovery line to said vessel
   (iii) releasing a gas into said fill line;
   (iv) heating said gas in said fill line;
   (v) reducing the pressure on said gas in said fill line to a predetermined pressure;
   (vi) introducing said gas in said fill line at a controlled flow rate and temperature to said
   vessel to establish a uniform interface between said gas and said vapors in said vessel; and
   (vii) displacing said vapors into said vapor recovery line.

8. The method of claim 7, wherein said predetermined pressure is from about 5 psia to about 1 psia.

9. The method of claim 7, wherein said gas is lighter than said vapors and is introduced into said vessel at a lower temperature than said vapors.

10. The method of claim 7, further comprising the step of stopping the flow of said gas into said vessel when said gas is detected in said vapor recovery line.

11. The method of claim 7, further comprising the steps of:
   (i) removing condensed liquids from said vapors in said vapor recovery line;
   (ii) increasing the combustibility of said vapors in said vapor recovery line by combining said vapors with a high BTU source material in said vapor recovery line; and
   (iii) burning said vapors.

12. The method of claim 7 wherein said gas is selected from the group consisting of carbon dioxide and nitrogen.

13. The method of claim 7 wherein said gas is introduced at the top of said vessel.

14. The method of claim 7 wherein said gas is introduced at the bottom of said vessel.

15. Apparatus for venting volatile organic vapors from a liquid storage vessel, comprising:
   (i) a fill line;
   (ii) a vapor recovery line;
   (iii) a purge medium to displace volatile organic vapors from a liquid storage vessel and into said vapor recovery line; and
   (iv) means for introducing said purge medium to said liquid storage vessel through said fill line at a predetermined pressure, and at a controlled flow rate and temperature to maintain a substantially laminar flow of said purge medium and establish a stratification between said volatile organic vapors and said purge medium.

16. The apparatus of claim 15 wherein said fill line connects to the bottom of said vessel and said vapor recovery line connects to the top of said vessel.

17. The apparatus of claim 15 wherein said fill line connects to the top of said vessel and said vapor recovery line connects to the bottom of said vessel.

18. The apparatus of claim 15 wherein said fill line connects to the top of said vessel and further comprises means for passing said purge medium to the lower portion of said vessel.

19. The apparatus of claim 15 wherein said vapor recovery line connects to the top of said vessel and further comprises means for receiving said vapors from the lower portion of said vessel.

20. The apparatus of claim 15 wherein said purge medium is lighter than said vapors.

21. The apparatus of claim 15 wherein said purge medium is heavier than said vapors.

22. The apparatus of claim 15 further comprising means for detecting said purge medium in said vapor recovery line.

23. The apparatus of claim 22, wherein said apparatus is portable.

24. The apparatus of claim 15 wherein said purge medium is inert with respect to said vapors.

25. The apparatus of claim 15 further comprising means for burning said displaced vapors.

26. The apparatus of claim 15 further comprising means for mixing said displaced vapors with a high BTU source material to increase the combustibility of said displaced vapors.

27. The apparatus of claim 15 further comprising means for removing condensed liquids from said displaced vapors.

28. Apparatus for venting vapors from a storage vessel, comprising:

(i) a fill line;

(ii) a vapor recovery line;

(iii) means for releasing a purge medium into said fill line;

(iv) means for heating said purge medium in said fill line;

(v) means for reducing the pressure on said purge medium in said fill line to a predetermined pressure; and (vi) means for introducing said purge medium in said fill line at a desired temperature and pressure into a liquid storage vessel containing vapors to establish a uniform interface between said purge medium and said vapors.

29. The apparatus of claim 28 wherein said apparatus is portable.

30. The apparatus of claim 28 wherein said heating means is an indirect heat transfer device.

* * * * *